Oct. 26, 1965 C. W. MILLS 3,214,640
POWER FLUCTUATION PROTECTION APPARATUS
Original Filed Aug. 28, 1961 2 Sheets-Sheet 2

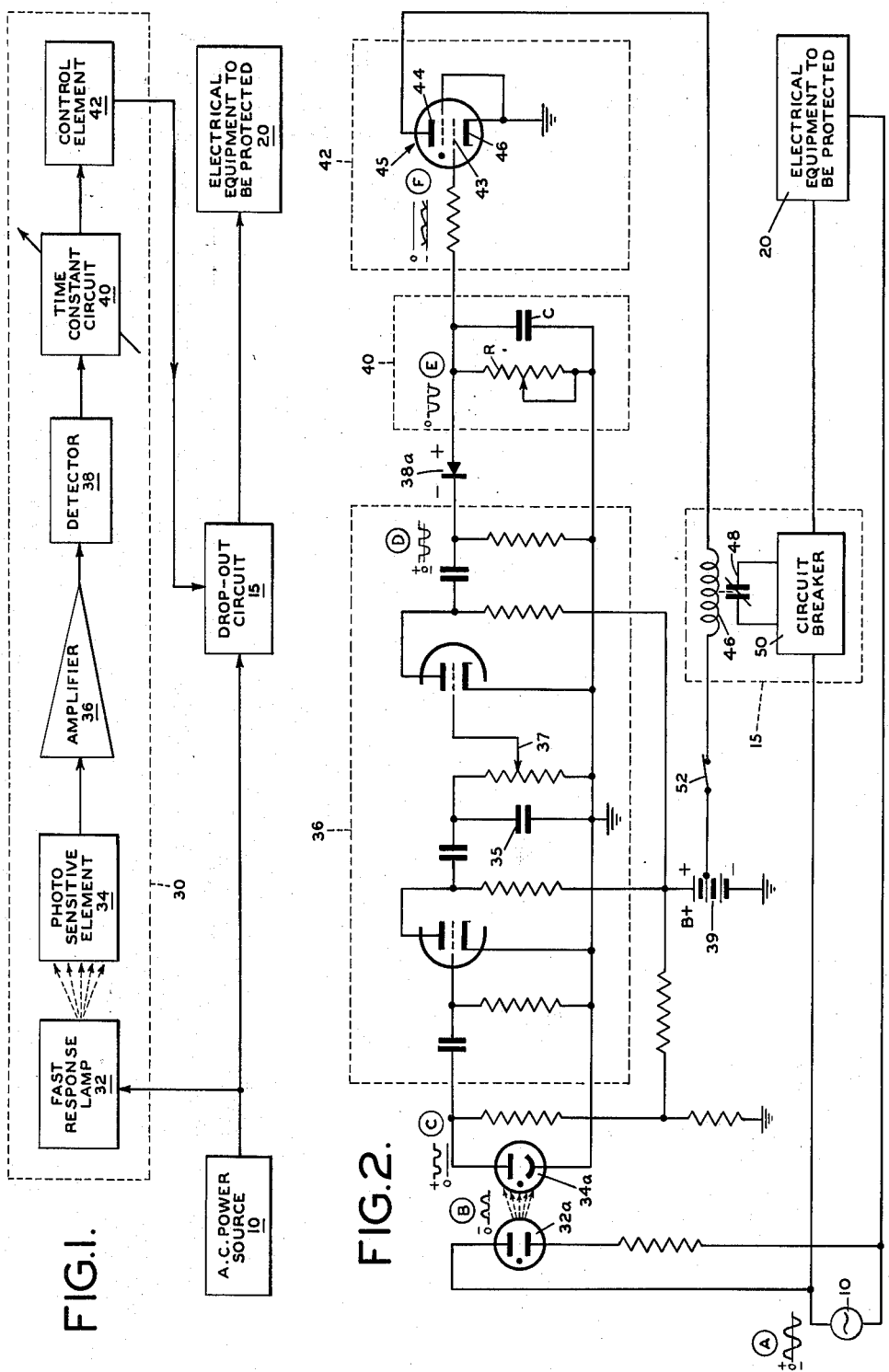

3,214,640
POWER FLUCTUATION PROTECTION APPARATUS

Charles W. Mills, Greenville, S.C., assignor to W. R. Grace & Co., Duncan, S.C., a corporation of Connecticut
Continuation of application Ser. No. 134,238, Aug. 28, 1961. This application Jan. 14, 1965, Ser. No. 427,539
6 Claims. (Cl. 317—31)

This is a continuation of a copending application, Serial No. 134,238, filed August 28, 1961, now abandoned.

This invention relates to apparatus for protecting electrical equipment from sudden transient dips in the line voltage supplied from an alternating current source. More particularly, the invention relates to means for monitoring the supply line voltage and providing a control signal for disconnecting the equipment from the line when a power dip or other short term transient fluctuation occurs in the supply voltage.

Certain types of electrical equipment in use today are highly susceptible to damage when a momentary drop in line voltage occurs which is then followed by an immediate reapplication of full line potential. Under such conditions there is great likelihood that conventional holding circuits, circuit breakers, and the like will not be responsive to, and hence not be activated by, such transient fluctuations in the line voltage, lasting for a fraction of a cycle or even a few cycles at most. When the voltage is restored, the sudden application of full line potential will then frequently result in severe strain on the electromechanical elements of an electrical system such as motor-generator sets, for example, and, in addition, will cause violent and oftentimes destructive current surges in inductive elements of the system such as transformers and the like. Therefore, the need exists for a sensitive protective device which is capable of monitoring the A.C. line potential, with a sufficiently fast response time to detect transient voltage fluctuations lasting for extremely short intervals of time, and providing a control signal for activating suitable drop-out circuitry for disconnecting the electrical system from the power line when such a potentially harmful condition exists.

Prior art devices for protecting electrical equipment in the event of power line failure, by removal of the equipment from the line, generally suffer from the disadvantage that the response time required for their activation is usually so long that they are unable to react fast enough, and thereby provide the necessary protection for the system, when a short-term voltage fluctuation, lasting a few cycles at the most, occurs. The present invention overcomes this major disadvantage of conventional protection devices and provides novel electronic means for detecting and responding to transient power line voltage fluctuations.

A feature of the proposed apparatus is the provision of a gas-type lamp, connected to the line, which is adapted to respond very rapidly to line voltage, and a photosensitive device for sensing radiation from the lamp, whereby in normal operation the lamp is illuminated and extinguished at double the line frequency, and the photosensitive device produces a train of double-frequency pulses of predetermined waveform. A waveform-sensing circuit connected to the photosensitive device, and a control circuit controlled thereby, is adapted to respond very rapidly to interruptions or other changes in the train of pulses, caused by transient fluctuations in the line voltage.

In a principal embodiment of the invention a lamp is utilized which has a fast response characteristic and is energized by the alternating current line potential being monitored by the protective device. The radiation emanating from this lamp impinges upon a photocell whose output current is amplified and applied to a detector which rectifies and transmits the A.C. component of the photocell signal waveform. The output of this detector is then applied to the control grid of a gas-filled thyratron tube through an RC (resistance-capacitance) circuit having a variable time constant. This time constant is adjusted such that under normal operating conditions, that is, when the A.C. line potential being monitored is uninterrupted by power fluctuations, the capacitor of the RC combination is re-charged to a sufficiently negative potential on each cycle of the rectified photocell signal waveform that the control grid of the thyratron is continuously maintained at a negative bias potential with respect to its cathode, thus preventing its firing. However, when a momentary dip in the line potential takes place, the signal derived from the lamp and photocell combination fluctuates accordingly, and causes the current supplied by the detector to be insufficient to prevent the capacitor from discharging towards zero potential, and the control grid then goes sufficiently in a positive direction so as to cause the thyratron to fire. When this situation occurs and the thyratron fires, the resultant plate current of the tube is employed as a control signal for activating suitable drop-out circuitry (which may be of conventional design) for removing the electrical system from the line.

It has been found, from empirical investigation, that the response characteristic of a protective device, constructed in accordance with the teachings of the present invention, is so rapid that voltage fluctuations as brief in duration as a quarter of a cycle of line potential of 60 c.p.s frequency may be detected by the device and cause it to respond. Through variation of the time constant of the RC combination, the sensitivity of the protection device may be adjusted to have a threshold response, i.e., the thyratron will fire and thereby generate a control signal only when the momentary power loss lasts for a predetermined length of time. This feature is particularly advantageous when it is known that only power interruptions lasting for a given time duration will cause deleterious effects on a particular electrical system, and that the effects of power interruptions of shorter duration will be negligible.

The foregoing and other objects, features and advantages of the present invention will be more readily understood from a consideration of the following detailed description of a preferred embodiment of the invention, as illustrated in the accompanying drawings:

FIGURE 1 is a block diagram of a preferred embodiment of the invention showing the control signal generated by the protective apparatus activating a drop-out circuit which precedes the electrical system which is to be protected from transient voltage fluctuations.

FIGURE 2 is an electrical schematic of a suitable circuit means for practicing the invention in accordance with the embodiment set forth in FIGURE 1.

Figure 4:
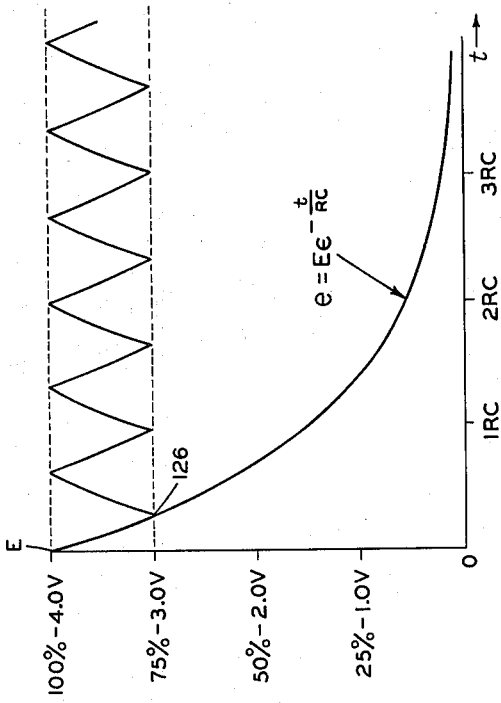
FIGURE 4 is a curve showing the discharge characteristics of a resistance-capacitance circuit combination.

Referring now to FIGURE 1, there is shown a source of alternating current potential 10, supplying electrical power to an electrical system 20 preceded by a drop-out circuit 15. The drop-out circuit may be of conventional design, comprising circuit breakers or various types of current interrupting devices, whereupon the receipt of an electrical control signal activates a suitable mechanism for disconnecting the electrical system 20 from the power source 10. The type of drop-out circuit is generally determined by the nature and size of the electrical system which is to be protected; however, magnetic controllers, which in their normal state are closed and which open upon receipt of an electrical control signal, may be satisfactorily utilized as circuit breakers in a wide range of electrical systems of the type previously described.

The power line voltage is monitored by a protection apparatus 30 which comprises lamp 32, photosensitive element 34, amplifier 36, detector 38, time constant circuit 40, and control element 42. The lamp 32 which is directly connected to the A.C. power source 10 has a fast response characteristic; that is, the intensity of its illumination rapidly follows the instantaneous magnitude of the energizing potential applied across its terminals. One class of lamps having this characteristic and found suitable for the present application is the gaseous-glow-discharge type. Such lamps generally have a pair of electrode elements which are enclosed in a sealed tube filled at low pressure with an inert gas, such as neon, argon, and the like. Depending upon the pressure of the gas contained in the tube envelope, a glow discharge will take place, i.e., the lamp will light, when a voltage applied across the electrodes reaches a predetermined magnitude. The intensity of the glow discharge will then vary as a function of the magnitude of the applied voltage so long as the voltage exceeds a certain minimum level. When the applied voltage recedes below this threshold level, the glow discharge will no longer be capable of being maintained, and the lamp will be extinguished. The voltage at which the lamp is extinguished (the threshold level for extinction) may or may not be the same as the threshold voltage required for the glow discharge to be established and the lamp thereby lit. For purposes of simplifying the subsequent explanation of the operation of the invention, it will be assumed, however, that these respective points are the same.

A thermally incandescent lamp, i.e., the ordinary electric light bulb, is not particularly suitable in this application, as its response characteristic is relatively slow. Such a lamp, wherein the illumination is generated from a heated filament, has a high thermal inertia such that, for the conventional 60 c.p.s. alternating power supply, the filament does not cool down sufficiently on the descending portion of the voltage cycle for the light output of the lamp to approach anywhere near extinction. Furthermore, because of thermal inertia, this type of lamp will continue to radiate light for a time period equivalent to a large number of cycles of the power supply after it is de-energized, as the temperature of the filament slowly cools down. Accordingly, a lamp having a fast response characteristic, such as the gas-filled discharge tube described, or in some applications, a fluorescent type lamp is preferably employed in principal embodiments of the invention wherein it is desired to have a protective apparatus possessing the capability of detecting and responding to transient voltage fluctuations lasting as briefly as a fraction to a few cycles of the power supply waveform.

As the lamp 32 responds to the absolute magnitude of the voltage supplied from the power source of alternating potential 10, it will be illuminated and extinguished at a rate which is double the frequency of the energizing power supply, and thus the lamp will be turned on and off twice in each full cycle of the supply voltage waveform.

The light radiation emanating from lamp 32 impinges upon a photosensitive element 34, which may be exemplified by a photocell generating a plate current component or output in response to the intensity of illumination incident upon the cell. The output from the photosensitive element 34 is in the nature of a periodic pulsating waveform having a frequency twice that of the alternating potential supplied by the power source 10. After removal of the average or D.C. level in the photosensor's output to eliminate the effects of background illumination, the pulsating output of the photosensitive element 34 is then magnified by amplifier 36 and applied to a detector or rectifier element 38 which passes only that portion of the A.C. component of the output or response signal having a particular polarity, for example, the negative part of the waveform. The output of the detector 38, which comprises only the particular portion of the pulsating response signal waveform having negative polarity, is then applied to the input of a two-state control element 42, typically a thyratron, through a variable time constant circuit 40. The time constant circuit 40 serves to "smooth out" the pulsating signal applied to the control element from the detector 38 such that during normal, uninterrupted operation of the power source 10 the voltage level at the input to the control element 42 is biased above a predetermined threshold value so that the control element is continuously maintained in a first state of operation.

When a power dip or fluctuation of predetermined duration, as determined by the setting of the parameters comprising the variable time constant circuit 40 occurs, the voltage level at the input of the control element 42 decreases to the threshold bias value, thereby allowing the control element to change states. Upon the shifting of the control element 42 from the first to the second state of operation, an electrical signal is generated at its output which is utilized to activate a drop-out circuit 15 of conventional design. Upon receipt of the control signal from the control element 42, indicating that a voltage interruption in the power line has occurred, the drop-out circuit 15 then disconnects from the line the electrical equipment 20 which is of such nature that it would be subject to severe damage if permitted to remain linked to the A.C. power source 10. As one example of the type of electrical equipment where the fast activation of a line drop-out upon the occurrence of a transient power dip is not only desirable but practically essential to non-detrimental operation, the invention herein proposed has been found to be especially suitable for use in conjunction with an electron beam generator system by providing protection both against damaging current surges in a resonant transformer and destructive physical stresses in a motor-generator set which together comprise a major portion of the power supply for the electron beam generator.

Figure 3:
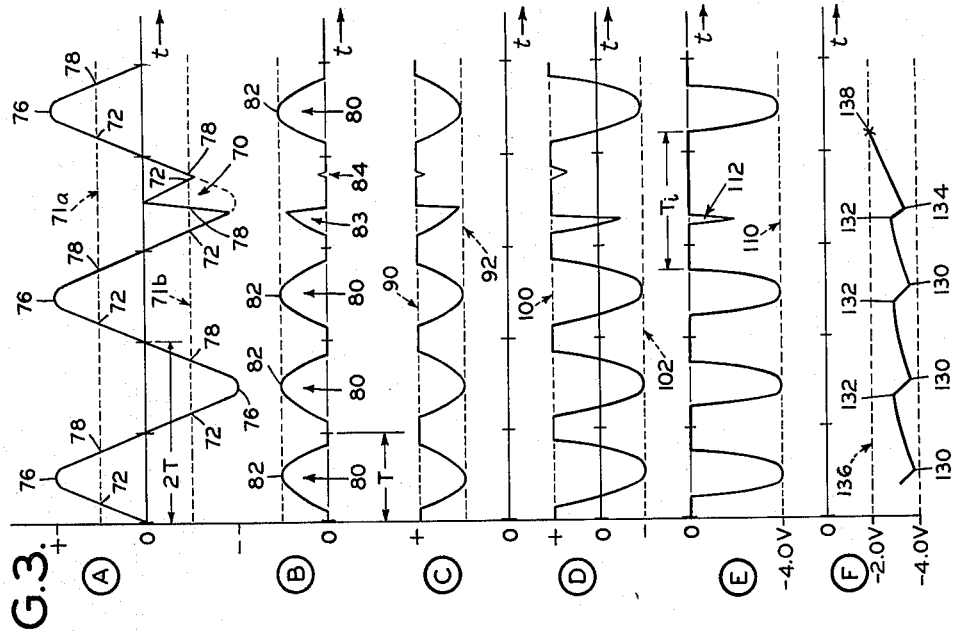
FIGURE 3 is a series of wave forms having a common time basis which will be helpful in understanding the theory and operation of the embodiment of the invention shown in FIGURES 1 and 2.

FIGURE 2 is a schematic of a suitable electrical circuit means for accomplishing the component functions indicated in the respective blocks of the diagrammatical embodiment of the invention shown in FIGURE 1. The individual circuit elements in FIG. 2 which are exemplary of, and correspond to, the particular block elements of FIGURE 1 are shown within dotted block outlines having the same reference numerals. In understanding the theory and operation of the embodiment of the invention shown in FIGURE 2, it will be helpful to make reference to the series of curves shown in FIGURE 3, which illustrate, on a common time basis, the waveforms appearing at various locations in the circuit diagram.

As before, there is shown in FIG. 2 a source of alternating potential 10 connected by a power line to electrical equipment 20 and having an output which is to be monitored for transient voltage fluctuations or power dips by the apparatus of the present invention. The sinusoidal waveform of the alternating potential supplied by the power source 10 is illustrated in FIG. 3A. This waveform has a period indicated as 2T, which, for the typical power line installation, would be equivalent to $\frac{1}{60}$ of a second. A power fluctuation or voltage dip, for purposes of illustrating the operating principles of the protective apparatus of the present invention, is shown as occurring exemplarily at 70 during the negative half of the second cycle of the power supply waveform.

A gas-filled tube of the glow discharge type is placed across the power line and energized by the alternating potential of the power source 10. When the absolute value of the voltage applied across this tube approaches the level indicated in FIG. 3A by the dotted horizontal lines 71a and 71b (which correspond to respective positive and negative potentials), a glow discharge will be established between the electrode elements within the tube with the resultant emission of light therefrom. As the rising voltage then exceeds this threshold level of illumination shown as 72, the intensity of the radiation generated by the gaseous discharge will increase as a function of the increasing voltage until the voltage reaches maximum point 76, at which time the intensity of the light radiation will likewise reach a maximum. As the voltage proceeds to fall from this maximum point, the intensity of the radiation from the lamp 32a likewise decreases until the extinction level 78 is reached wherein the absolute magnitude of the voltage is insufficient to maintain the gaseous discharge. For purposes of convenience, the threshold level of illumination 72 and threshold level of extinction 78 for the lamp 32a are shown to occur at the same voltage magnitude, indicated by the dotted lines 71a and 71b; however, it is to be expressly understood that the satisfactory operation of the apparatus is in no wise dependent upon this similarity. One type of lamp commercially available and found suitable for use in the present invention is the AR-1 argon lamp manufactured by General Electric which has the characteristics described above.

The relative intensity of the light output of the lamp 32a is illustrated in FIG. 3B. It will be observed that the waveform of the intensity of the radiation emanating from the lamp is of a pulsating nature wherein the "pips" 80 correspond to the regular, clipped-off peak portion of the input voltage waveform. Furthermore, the frequency of this pulsating wave is twice that of the waveform of the input supply voltage since light intensity has no polarity, and therefore the output of the lamp on the negative half of the supply voltage cycle is identical to that on the positive half of the cycle. The waveform of the intensity of the lamp radiation thus has a period T which is one-half that of the input voltage waveform, or 1/120 of a second.

The intensity of the illumination emitted from the lamp 32a reaches a maximum point 82 at the same instant in time that the supply voltage waveform goes through a negative or positive maximum. Notice that, during the voltage half cycle in which the power dip 70 occurs, only those portions, indicated as 83 and 84 in the waveform shown in FIG. 3A, where the voltage exceeds the illumination and extinction levels of the lamp (72 and 78) are reflected as corresponding radiation outputs from the lamp 32a in FIG. 3B.

Illumination produced from the activation of the glow discharge in gas tube 32a is incident upon a photocell 34a which is adapted to have peak response to the wavelength of light radiated by the lamp. When the glow lamp is dark, the output or plate current of the photocell will be approximatey zero. Accordingly, when plate current is not flowing, the potential at the plate electrode of the photocell will be at a maximum. Correspondingly, when plate current flows as a result of light radiation from the illuminated glow lamp impinging upon the photocell, the plate potential will vary in an inverse manner; that is, the plate voltage will decrease as the plate current increases, with the voltage reaching a minimum when the light intensity is at a maximum, and vice versa. A curve of the potential appearing at the plate electrode of the photocell 34a due to the incidence of radiation from the glow tube 32a is shown in FIG. 3C, with the horizontal dotted lines 90 and 92 representing the respective maximum and minimum plate voltage levels during normal operation of the alternating current power supply 10.

The voltage appearing at the plate of the photocell 34a is then coupled through a capacitor, which blocks the passage of the D.C. component of the photocell output, to a two-stage amplifier 36 of conventional design having a gain control 37. This amplifier may typically comprise a single tube having two separate triode sections enclosed therein said associated circuitry, one suitable tube for an application of this type being a 12AT7. The amplifier 36 is preferably provided with a high frequency by-pass filter, as exemplified by capacitor 35 inserted between its two stages, for shunting to ground any transients of a spurious nature which might be introduced from extraneous sources. As two stages of amplification are provided by the amplifier 36, the pulsating voltage, representing the amplified A.C. component or response signal of the photocell 34a, appears at the output of the amplifier in phase with the input signal taken from the plate of the photocell. The waveform of this amplified response signal is illustrated in FIG. 3D. With the D.C. component of the photocell output removed, the pulsating signal at the output of the amplifier 36 exhibits a waveform having a maximum positive value lying along the horizontal dotted line 100 and a maximum negative value along the line 102, the average value of the waveform being zero.

This amplified response signal is then applied to a rectifier or detector element, represented by the non-linear diode 38a, which transmits only the negative portion of the waveform, the positive component being effectively blocked by the high reverse-direction impedance of the rectifier element. FIG. 3E shows the voltage waveform appearing at the output terminal of the diode element 38a as it would appear if there were no energy storage circuitry immediately following. This curve will be helpful in understand the nature of the actual voltage waveform applied to the input of the time constant circuit 40, which illustratively comprises a parallel combination of a variable resistance element R and a capacitor C.

Since only the negative component of the signal waveform generated by the photocell is transmitted by the detector 38a, there is a substantial portion of each cycle of the waveform when the instantaneous voltage is zero. This portion of the signal waveform cycle corresponds to the summation of the voltage "dead zone" of the glow tube 32a, wherein the energizing potential is insufficient to maintain the gaseous discharge, and that fraction of the waveform cycle occupied by the positive component of the protocell response signal which has been blocked by the detector element 38a. It is to be noted that the smaller "pip" 84, which was present in the fourth cycle of the output signal from the photocell as shown in FIG. 3B, is not represented at the output of the detector as shown in FIG. 3E, since it did not possess any negative component counterpart in the voltage signal appearing at the output of the amplifier 36 and applied to the input of the diode element 38a. It will be observed that, due to the voltage fluctuation or power loss 70 occurring in the negative portion of the second cycle of the A.C. supply waveform (FIG. 3A), there exists a considerable period of time, $T_i$, between the third and fifth cycles of the pulsating signal waveform when the instantaneous voltage appearing at the output of the detector element 38a is zero, broken only by a very small negative voltage "pip" 112 occurring during the fourth cycle of the waveform (FIG. 3E).

For purposes of illustration, the regular waveform of the signal appearing at the output of the detector, as shown in FIG. 3E, is taken to have a maximum negative value of —4 volts, as represented by the dotted horizontal line 110. This value of the negative maximum may be readily altered through adjustment of the gain control 37 of the two-stage amplifier 36.

As previously stated, the output of the detector 38a is applied to a time constant circuit 40 comprising the parallel combination of variable resistor R and capacitor C. When an alternating potential is applied across this combination, the capacitor C, being an energy storing device, is charged up to a peak value E during the increasing or ascending portion of the voltage cycle and is discharged during the decreasing or descending portion of the cycle. The rate at which the capacitor is discharged, and hence the minimum voltage level to which it descends during a full cycle of the input voltage waveform, is determined by the time constant of the circuit 40. For the parallel combination of the resistor R and the capacitor C shown, the time constant is mathematically equivalent to the product of the resistance of R in ohms and the capacitance of C in farads. The voltage e existing at any instant of time across the capacitor C during the discharging portion of the waveform cycle is an exponential function and may be expressed by the following formula:

$$e = E \epsilon \frac{-t}{RC}$$

where E represents the initial or peak voltage across the capacitor at the instant discharging commences, $\epsilon$ is the base for natural logarithms, t is the time in seconds measured from the start of the discharge period, and RC is the time constant for the circuit.

This effect is exemplified in FIG. 4 wherein it is shown that, starting from an initial condition or peak value for E of —4 volts, the voltage across the capacitor C steadily decays towards zero potential in an exponential manner according to the above formula. Thus, after a time period has elapsed equal to the time constant RC, the voltage will have decayed to 36.8% of its initial potential or —1.5 volts. Similarly, after a time period has elapsed equivalent to twice the time constant (2RC), the voltage will fall to 13.5% of the initial value or —0.54 volt. The voltage across the capacitor will continue to decrease towards zero potential until the voltage applied to the input of the time constant circuit by the detector 38a ceases to be less than the instantaneous capacitor voltage e and begins to rise above it on the ascending portion of the signal waveform. At the instant this occurs, the capacitor C ceases to discharge through the resistance R and begins instead to be recharged back to the peak value E while following the ascending portion of the signal waveform. For the particular conditions illustrated in FIG. 4, the charging of the capacitor C by the ascending portion of the signal waveform first commences when the capacitor has discharged to 75% of its initial peak value or —3 volts, as shown at 126. Recharging by the ascending portion of the signal waveform continues until the capacitor voltage e reaches its initial peak value of —4 volts, whereupon the cycle commences again. Thus, during regular, uninterrupted operation of the power supply 10, the voltage appearing across the capacitor C of the time constant circuit 40 will fluctuate between a negative maximum of —4 volts and a minimum of —3 volts.

The fluctuating negative voltage appearing across the capacitor C of the time constant circuit 40 is applied to the control grid 43 of a thyratron tube 45, which is exemplary of the two-state control element 42. During normal uninterrupted operation of the power supply 10 the thyratron tube is maintained in the unfired or "off" state by the negative bias potential applied to its control grid 43 from the output of the time constant circuit 40. As long as the control grid is maintained sufficiently negative with respect to the cathode 46 of the thyratron, current will not flow in the circuit of the plate electrode 44. If, however, the control grid voltage should be permitted to decrease in a positive direction to a critical threshold value, the grid will no longer be capable of preventing electrons drawn from the cathode 46 from flowing to the plate electrode 44, and the thyratron will fire. The gas-filled electron discharge tube, which the thyratron typifies, has the important characteristic that firing, i.e., the initiation of plate current flow, takes place extremely rapidly once the control grid potential drops to the critical threshold value. Accordingly, the thyratron tube may be expeditiously utilized as a control element for deriving an output signal from the plate circuit when an input signal of proper magnitude and polarity is applied to its control grid thereby causing the element to change states.

In the embodiment of the invention illustrated in the circuit schematic of FIG. 2, the gain control 37 of the two-stage amplifier 36 is suitably adjusted such that, for normal operation of the A.C. power source 10, the negative signal component appearing at the output of the detector element 38a has a peak value of —4 volts as shown in FIG. 3E. The variable resistance R of the time constant circuit 40 is then adjusted such that the voltage appearing across the capacitor C, which is utilized to supply the negative bias potential for the control grid 43 of the thyratron tube 45, does not drop appreciably during that portion of the waveform cycle when the capacitor is discharging. As illustrated in FIG. 3F, the variable parameter R of the time constant circuit 40 is adjusted such that the negative voltage appearing across the capacitance C fluctuates between a peak value 130, which is substantially equal to —4 volts, and a minimum value 132 which is shown as being approximately —3 volts. Thus the RC time constant is illustratively adjusted, as represented in FIG. 4, so that the capacitor C only discharges to 75% of its peak value E during that portion of the signal waveform cycle when the instantaneous voltage derived from the detector element 38a is less than the instantaneous capacitor voltage e.

The thyratron tube 45 is indicated in FIG. 3F as having a critical control grid bias level 136 of —2 volts; that is, the thyratron will fire, for a particular value of plate potential, when the control grid 43 is at or less negative than —2 volts with respect to the cathode 46. The thyratron draws its positive plate potential from a suitable source of B+ voltage such as battery 39. Also connected in series in the plate circuit of the thyratron 45 is a solenoid coil 46, which forms a part of the equipment dropout circuit 15, and a normally-closed switch 52 which serves to disconnect the plate electrode 44 from the potential supply 39 when it is desired to turn off or reset the thyratron after it is fired. This switch 52 may also be employed to prevent the thyratron tube 45 from being fired when the protective apparatus is initially turned on and the capacitor C of the time constant circuit 40 has not yet been sufficiently charged up to provide an inhibiting bias level on the control grid 43 of the thyratron.

In some embodiments of the invention, the supply of B+ potential for the plate circuit of the thyratron tube 45 may be derived from an element contained in the electrical system which is to be protected by the proposed apparatus, rather than from a separate supply such as battery 39. In such situations, the switch 52 may be eliminated, if desired, as the removal of the electrical equipment 20 from the power line will also effectively disconnect the plate circuit of the thyratron from the B+ supply. Thus, as an illustration, the thyratron plate circuit may be energized from a D.C. generator which is a portion of the electrical equipment 20 to be protected. For example, that equipment may include an A.C. motor driving an A.C. generator of different frequency and also the D.C. generator referred to above. The D.C. generator may serve to supply the exciting field for the A.C. generator and also serve as the plate voltage supply for the thyratron.

As previously explained, during normal, uninterrupted operation of the alternating power source 10, the amplified signal from the photocell 34a, which is generated by the pulsing illumination of the glow tube 32a in response to the waveform of the alternating supply, is of sufficient magnitude to maintain the control grid 43 of the thyratron 45 at a negative bias well above the critical value for firing of the tube. However, when a power dip or voltage fluctuation such as 70 occurs, the magnitude and duration of the charging voltage pulse supplied to the time constant circuit 40 by the signal waveform is greatly curtailed, as is represented by the correspondingly small "spike" of voltage 112 which appears in the fourth cycle of the rectified signal waveform shown in FIG. 3E during the time interval $T_1$. As a consequence, the capacitor C is not fully recharged to its initial peak value E by the shortened pulse 112 but reaches instead only an intermediate voltage value shown as 134 in FIG. 3F. The capacitor then continues to discharge toward zero potential during the remainder of the time period $T_1$ when the rectified waveform at the detector output has zero value. As shown in FIG. 3F, the control grid bias potential of the thyratron tube 45 follows the capacitor discharge until the critical value is reached, as indicated at 138, at which point the thyratron fires.

Through variation of the setting of the resistance R in the time constant circuit 40, the rate at which the capacitor C discharges, during that portion of the signal cycle when its rectified waveform is either zero or less than the instantaneous voltage across the capacitor, may be adjusted. Accordingly, firing or no-firing of the thyratron tube 45 by a power dip or voltage fluctuation of predetermined magnitude and duration can be controlled by manipulation of the variable resistance R. For the power dip assumed, which lasts for only a portion of a half cycle of the power supply, the setting of the time constant circuit 40 through variation of the resistance R effectively determines whether or not the capacitor voltage, and hence the control grid bias voltage, will drop to the critical firing level of $-2$ volts during the time interval $T_1$.

Figure 5:
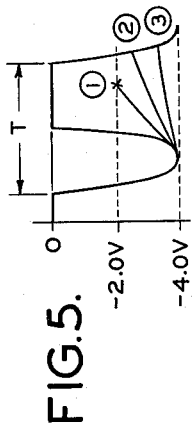
FIGURE 5 is a curve illustrating the changes accomplished in the discharge rate of a resistance-capacitance combination through variation of its time constant.

FIG. 5 illustrates the effect produced in the protective apparatus through variation of the discharge rate of the capacitor C by adjustment of the variable resistance element R. Curve 1 shown in FIG. 5 has a time constant (RC product) of too short duration, thereby indicating an unsuitable setting for R, as the thyratron 45 would tend to be fired in normal, uninterrupted operation of the A.C. supply 10, since the capacitor C would discharge down to the critical value of control grid bias in the course of a single cycle of the regular signal waveform. Curves 2 and 3 of this figure exhibit longer time constants, and accordingly the thyratron tube 45 would not be inadvertently fired during normal operation of the alternating supply with these settings of the resistance R in the time constant circuit 40. Curve 2 shows a time constant approximating that shown in FIG. 3F and thus indicates that a power fluctuation lasting as briefly as a fraction of a cycle of the supply waveform would be sufficient to cause the thyratron tube to fire. Curve 3 has a somewhat longer time constant than curve 2, and thus this setting would not result in a firing of the thyratron tube until a power loss lasting for several cycles of the supply waveform had occurred. It is to be understood, of course, that variation of the setting of the time constant circuit 40 could also be effected through suitable adjustment of a variable capacitance element substituted for the fixed capacitor C.

When the thyratron tube 45 fires, thereby indicating that a power fluctuation or voltage dip of predetermined magnitude and duration has occurred in the waveform of the alternating potential supplied by the power source 10, a heavy surge of current begins flowing in the plate circuit of the tube. This heavy surge of plate current drawn by the thyratron tube at the instant of firing is then utilized as a control signal to activate the drop-out circuit 15 which disconnects the electrical equipment 20 from the A.C. power source 10.

An exemplified in FIG. 2, upon the receipt of the current surge or control signal from the plate 44 of the thyratron tube 45, the solenoid coil 46, which possesses adequate internal resistance to limit the magnitude of the current flow to a suitable value, is sufficiently energized thereby to cause the opening of normally-closed contactor 48. The opening of contactor 48 in turn causes the activation of suitable circuit-breaking means 50 for rapidly opening the power line and thereby disconnecting the electrical equipment 20 from the A.C. power source 10. As previously stated, the circuit-breaking or circuit-interrupting device 15 utilized may be of conventional design whereupon the recipt of an electrical control signal activates a suitable mechanism for disconnecting the electrical system which is to be protected from the power source. The type of drop-out circuitry employed is a matter of design choice and is generally determined by the nature and size of the electrical system which is to be safeguarded from transient power fluctuations.

Upon the activation of the circuit breaker 50, the electrical equipment 20 is quickly disconnected from the energizing source 10 and the line preferably remains open, even after the control signal from the thyratron ceases, until the circuit breaker 50 is reset. The electrical equipment 20 is thus protected against the sudden reapplication of full line potential when the transient fluctuation ends and the supply voltage is restored. The protective apparatus of the present invention therefore closely monitors the power line waveform and rapidly provides a control signal for activating suitable drop-out circuitry for disconnecting the electrical system from its A.C. power supply when a potentially harmful condition exists due to the presence of a transient power fluctuation.

In some applications it may be desirable to utilize the control signal generated by the thyratron to perform other functions in addition to activating an equipment drop-out circuit. One such application is the use of the control signal from the thyratron as an input to a recorder to monitor and count the number of sudden voltage dips exceeding a given magnitude and duration which occur over a given time period.

Whereas the terms and expressions which have been employed are used as terms of description and not of limitation, and whereas there is no intention, in the use of such terms and expressions, of excluding any equivalents of the features shown and described, or portions thereof, it being recognized that various modifications are possible within the scope of the teachings of the invention, it is hereby stated and desired that the scope of the invention be limited solely by the following appended claims.

What is claimed is:

1. In a rapid-acting system for protecting electrical apparatus against fluctuations in its alternating electric supply, in combination, a fast-response lamp connected to said electric power supply and emitting pulses of light of intensity and frequency related to the amplitude and alterations in said supply, a light-sensing means including a photosensitive device positioned to respond to light from said lamp and adapted to generate a pulsating signal related to the waveform thereof, a control device having a first state and a second state, means including a waveform-sensing circuit connected to receive said pulsating signal from said light-sensing means and also connected to said control device and adapted to shift it from said first state to said second state in response to a change in the waveform of said light pulses caused by a fluctuation in said electric supply, and a circuit-interrupting device connected to said control device and controlled thereby for disconnecting said electrical apparatus from its electric power supply when said control device is shifted to said second state.

2. A combination according to claim 1 in which said lamp is a gas-filled lamp adapted to be illuminated and extinguished at double the frequency of said alternating electric supply, whereby to cause both the light emitted by said lamp and the pulsating signal generated by said light sensing means to comprise pulses of double frequency.

3. In a rapid-acting system for protecting electrical apparatus against fluctuations of a fraction of a cycle or greater in its alternating electric power supply, in combination; a fast-response lamp energized by said electric power supply and emitting pulses of light having a frequency twice that of said supply; a light-sensing means including a photosensitive device positioned to respond to light emitted from said lamp and adapted to generate a pulsating electrical signal having a waveform related to the waveform of said emitted light; means including a detector connected to said light-sensing means, a time constant circuit connected to said detector, a normally "off" discharge tube having a control electrode connected to said time constant circuit, said detector and time constant circuit being responsive to the waveform of said electrical signal from said light-sensing means and adapted to fire said discharge tube when a power fluctuation of a predetermined magnitude and duration occurs in said supply; and a circuit-interrupting device connected to said discharge tube and controlled thereby for disconnecting said electrical apparatus from its electric power supply when said discharge tube is fired.

4. In a system for protecting electrical apparatus subject to damage resulting from extremely short-term transient change of a fraction of a cycle or greater in its alternating current supply, in combination, a gas-filled lamp connected to said supply and emitting pulses of light having a frequency twice that of said supply, a photosensitive device responsive to illumination from said lamp for generating an electrical signal of periodic waveform related to the frequency and intensity of said light pulses, means for amplifying said signal, means including a non-linear device and a time constant circuit for sensing said amplified signal and for generating a bias voltage determined by the waveform of said signal, whereby transient changes in said supply produce a response in said bias voltage at a rate determined by said time constant circuit, and rapid-acting circuit-controlling means having an input terminal connected to an output of said time constant circuit, said circuit-controlling means being activated by said response produced in said bias voltage by said transient changes thereby to disconnect said apparatus from its alternating current supply.

5. A combination according to claim 4 wherein said gas-filled lamp is illuminated when the absolute magnitude of the instantaneous voltage of said alternating current supply exceeds a first, non-zero value, and said illumination is extinguished when the absolute magnitude of the voltage of said supply falls below a second, non-zero level.

6. A device for detecting a transient fluctuation of a fraction of a cycle or greater in an A.C. voltage supply comprising, in combination, fast-response illumination means energized by said A.C. voltage and emitting pulses of light having a frequency twice that of said supply, a photosensitive element for generating a pulsating electrical signal responsive to the frequency and intensity of light pulses emitted from said illumination means, means connected to said photosensitive element for amplifying said signal, non-linear means for transmitting only a portion of said amplified pulsating signal, energy storage means connected to said non-linear means for receiving said portion of said signal, and a normally "off" discharge tube having a control grid which receives a bias voltage from said energy storage means, the level of said bias voltage being determined by the waveform of said portion of said signal, whereby a transient fluctuation in said A.C. voltage of predetermined magnitude and duration is reflected in the waveform of said pulsating signal and causes said bias voltage to reach a level causing said discharge tube to fire, thereby indicating the occurrence of said transient fluctuation.

References Cited by the Examiner
UNITED STATES PATENTS

| | | | |
|---|---|---|---|
| 3,004,174 | 10/61 | Seidman | 328—146 X |
| 3,029,423 | 4/62 | Koranye | 340—253 |

SAMUEL BERNSTEIN, *Primary Examiner.*